June 24, 1969 — D. R. HART ET AL — 3,451,377

APPARATUS FOR PREVENTING A COW FROM KICKING

Filed Jan. 25, 1967

INVENTORS
DON REX HART
WILLARD L. PADGETT
BY
Hood, Gust & Irish

ATTORNEY

United States Patent Office 3,451,377
Patented June 24, 1969

3,451,377
APPARATUS FOR PREVENTING A
COW FROM KICKING
Don Rex Hart, R.R. 1, and Willard L. Padgett, R.R. 2,
both of Worthington, Ind. 47471
Filed Jan. 25, 1967, Ser. No. 611,735
Int. Cl. A01j 7/00; A01k 29/00
U.S. Cl. 119—96                                    2 Claims

ABSTRACT OF THE DISCLOSURE

An apparatus for firmly engaging the stifle joint of a cow's hind leg and the flesh external to the stifle joint, thereby preventing the cow from kicking the leg so engaged. In one form of the present invention, which is used in combination with a stall having side and rear members, the leg of the cow is also secured to a rear member of the stall as well as to the member which engages the stifle joint.

---

The present invention, which is an improvement over the invention disclosed and claimed in U.S. Patent No. 3,266,463 issued to Hart and Padgett, relates generally to an apparatus for preventing a cow from kicking, and more particularly to the provision of such an apparatus which may be shifted readily from stall to stall and which is more effective for the purpose intended than prior art apparatus. Normally there is but quite a low percentage of cows in a dairy herd which are prone to kick when milked by hand or when the cups of a milking machine are applied to the cow's teats. Some cows will use their hind feet to try to kick off the cups, even after the cups have been applied and during the milking operation. A cow can cause considerable injury to herself and damage to the milking equipment by kicking.

The kick of a cow may be quite violent. A cow is capable of kicking forwardly, sidewise and backwards. It has long been a custom to put a strap or a chain around the legs of a kicking cow to draw the legs closely together whereby neither leg may be lifted to raise a foot to kick. However, the kicker cow gets wise to this preventive means and will set up quite a bit of kicking to resist the application of the strap or chain.

Many dairymen, when milking cows by hand or when stripping after removal of the machine cups, are exposed to the kicking of the cow, and this kicking when the man is stooped over or sitting on a stool may seriously injure him. Consequently, a dairyman will often push his head into the flank of the cow to have his head in the path of the lower end of the uppermost bone of the hind leg, thereby preventing the upward swing of that bone as is required to get the foot of that leg off the floor and carry it into the kicking action. However, the pressure of the head into the cow's flank has to be quite high and constant, or otherwise the cow will sense the lower pressure or none at all, and slyly get in the kick. Knowing that the application of pressure into the cow's flank will tend to prevent the cow from kicking, some farmers have used mechanical apparatus which applies the proper pressure to the cow's flank.

It is the primary object of the present invention to provide an apparatus which will engage, with a constant pressure, the stifle joint of a cow's hind leg and the flesh surrounding the stifle joint so as to secure the leg from moving to a kicking position.

In one form of the present invention, a flexible member, such as a chain, is provided for securing the hind leg of a cow, which is known to be a bad kicker, to that portion of the apparatus which engages the stifle joint and to a rear member of the stall in which the cow is being milked. Thus, it is a further primary object to provide a means for insuring that even the worst kicker cows cannot damage themselves, the milking equipment or an attendant.

Another object of the present invention is to provide an exceedingly simple mechanism for the purpose intended which may be simply dropped over a top rail of the stall and quickly adjusted to have the engaging member properly positioned relative to the flank of the cow, all without mechanically modifying any part of the stall as will be explained further along in this description.

Still another object of the present invention is to provide such an apparatus whereby no tools are required to operate it or to rest it upon a stall member or remove it therefrom. In fact, only three adjustments are necessary for adapting the apparatus for use with a particular cow.

Further objects of the invention will appear as the description proceeds.

To the acomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
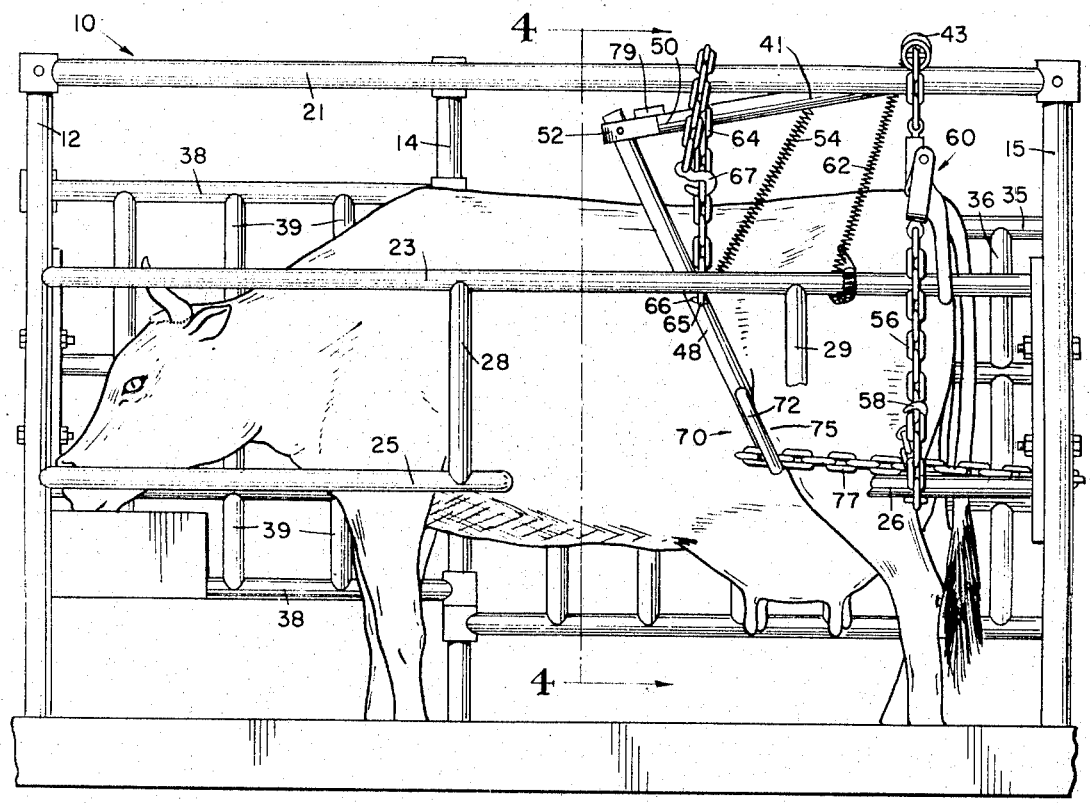
FIG. 1 is a more or less diagrammatic illustration in side elevation of a cow in a typical milking stall with the apparatus of the present invention operatively arranged to prevent the cow from kicking her left, hind leg.

The apparatus of the present invention is adjusted for use in combination with a stall having side members and rear members, though it is to be understood that it is not limited to the specific form of stall shown in the accompanying drawings and discussed in this description.

The illustrated stall, indicated generally by the reference number 10, comprises four posts 12, 13, 14, and 15 which are typically upstanding steel tubes anchored at their bases to provide support for the various members which make up the stall. As clearly seen in FIG. 2, a brace 17 is connected between the uppermost portions of the posts 12 and 14 and a brace 19 is connected between the uppermost portions of the posts 14 and 15. The left side of the stall 10, i.e., the side from which the milking machine components are applied to the cow's udder, in this present case, is defined by an upper side member 21, middle side member 23 and lower side members 25 and 26. As viewed in FIG. 1, the left-hand end of the lower side member 25 is connected to the post 12 and the right-hand end of said member, which terminates at approximately the center of the stall 10, is anchored to the mid-portion of the side member 23 by a bar 28. In a similar manner, the right-hand end of the lower side member 26 is connected to the post 15 and the left-hand end of said member, which terminates just to the rear of the cow's flank, is anchored to the side member 23 by a bar 29. The juncture between the side member 26 and the bar 29 is broken away in FIG. 1 so as to show clearly the flank-area of the cow. The open space provided between the bars 28 and 29 and the lower side members 25 and 26 permits easy access to the flank and udder area of the cow.

The cow is admitted into the stall 10 through a gate 31 and is removed from the stall through a gate 32. In FIG.

Figure 2:
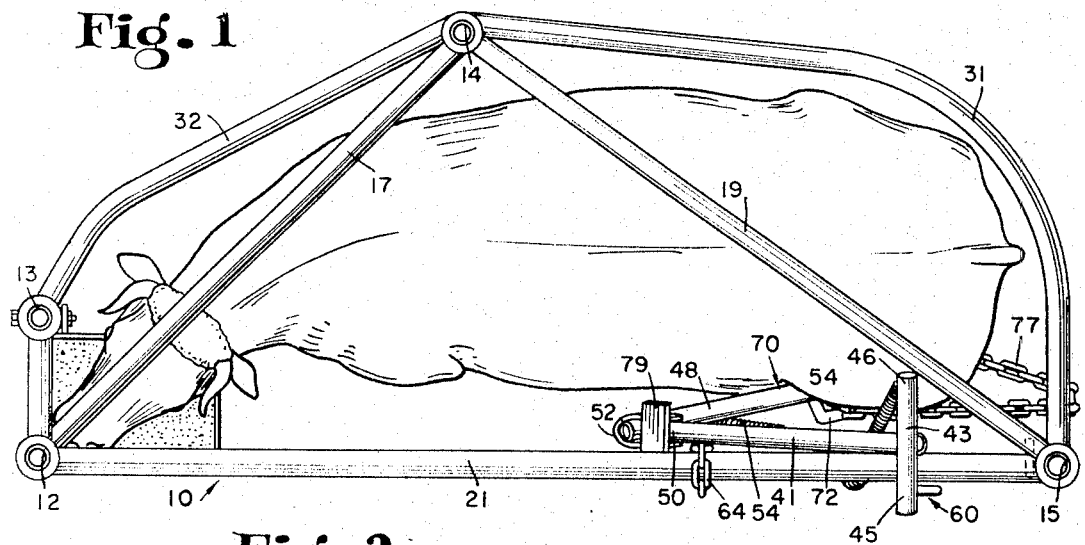
FIG. 2 is a top view of the cow, stall and apparatus of the present invention, as shown in FIG. 1.
Figure 3:
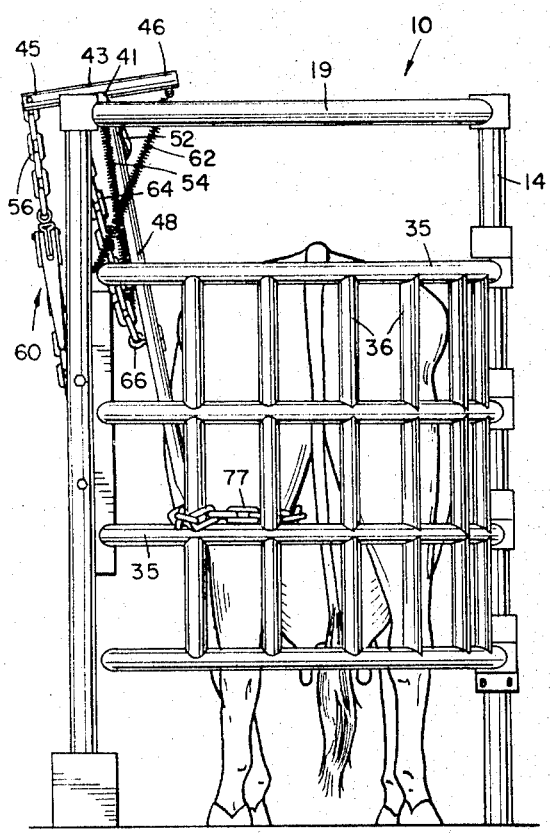
FIG. 3 is an end view, taken from the right hand side of FIG. 1.

2, it can be seen that both gates 31 and 32 are hingedly mounted on the post 14. The gate 31 comprises a plurality of inwardly curving horizontal members 35 and a plurality of vertical members 36, the members 31 being curved to form the rear backside and the rear of the stall 10, as seen in FIGS. 2 and 3. The gate 32 comprises a plurality of generally inwardly curving horizontal members 38 and a plurality of vertical members 39 as seen in FIG. 1. The gates 31 and 32 are preferably securely closed when the cow is being milked. Specific securing means for the gates 31 and 32 are not a part of this invention and, therefore, are not shown or discussed. As will be discussed later on in this description, the apparatus of the present invention urges the hind portion of the cow toward the gate 31, and therefore, the gate 31 must be securely held against the post 15. Since, as mentioned previously, the kick of a cow may be quite violent and since, in one form of the present invention, the cow's left, hind leg is secured to the gate 31, it is preferable that the gate be fabricated in such a manner as to be quite strong and durable.

The apparatus of the present invention, which is to be used in combination with a stall, such as the stall 10, comprises a major bar 41, to which is fixed across its rear end a short rest bar 43 with portions 45 and 46 of approximately equal length extending approximately at right angles from the major bar 41. The rest bar 43 and major bar 41 comprise a crank which is rockably mounted on the upper side member 21. A swing bar 48 is hingedly connected to the forward end 50 of the major bar 41 between the sides of a U-shaped bracket 52 which is rigidly connected to the major bar 41. The hinge connection between the swing bar 48 and major bar 41 is such as to permit rocking of the swing bar in a single plane relative to the major bar 41, the single plane preferably including the swing bar 48 and major bar 41. The U-shaped bracket 52 is proportioned and arranged to limit the forward and rearward movement of the swing bar 48 by a predetermined amount. In a preferred form of the invention, a spring 54 is connected between the major bar 41 and swing bar 48 resiliently to urge the swing bar toward its limit of rearward movement.

Figure 4:
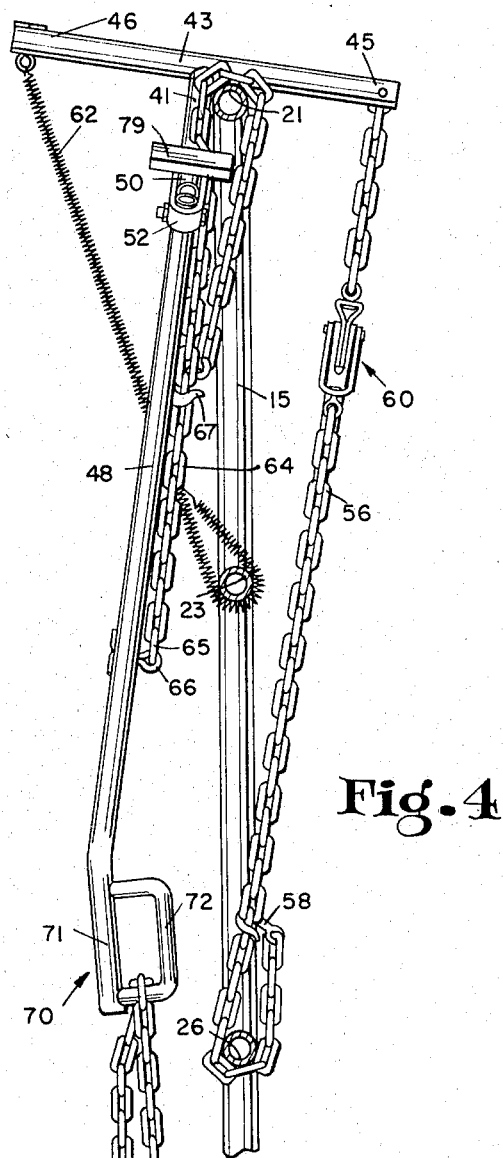
FIG. 4 is a fragmentary sectional view taken generally along the line 4—4 in FIG. 1.

A chain 56 is connected at one end to the end portion 45 of the rest bar 43 to hang downwardly therefrom. The lower end of the chain 56 is connected to the lower side member 26 as shown in FIGS. 1 and 4. Preferably, the lower end of the chain 56 is provided with a hook 58 which engages a selected link of the chain 56 to provide the proper connection between the chain 56 and the lower side member 26. A take-up device, indicated generally by the reference number 60, is connected at a convenient height in the chain 56. The take-up device 60 may be any well known means for effectively shortening the chain 56, thereby pulling downwardly on the end portion 45 of the rest bar 43. Such take-up devices are generally referred to in the trade as "boomers."

An extensible spring 62 is connected between the end portion 46 of the rest bar 43 and the middle side member 23 so as to oppose resiliently the weight of the chain 56 and the take-up device 60 which are connected to the opposite end portion 45. Of course, when the take-up device 60 is operated effectively to shorten the length of the chain 56, it is operated in opposition to the spring 62. In the illustrative embodiment, the lower end of the spring 62 is carried around the metal side member 23 and hooked back onto itself to give an effective length between the end portion 46 and the side member 23. The illustrated arrangement for the spring 62 is, therefore, a simple means for adjustably balancing the rest bar 43 on the upper, side member 21.

A chain 64 is secured by a lower end 65 to the swing bar 48 intermediate its ends, at a point, such as indicated at 66. The location of this connection 66 may vary a few inches up and down the swing bar 48, and as indicated in FIG. 1, the lower end of the spring 54 may also be connected at the point 66. The chain 64 is carried upwardly and over the upper, side member 21 and carried downwardly to engage by hook 67 into a link of the chain 64 below the side member 21. Thus, the chain 64 may be shifted at will along the upper, side member 21 and may be lengthened or shortened to position the swing bar 48 to a desired location.

Figure 5:
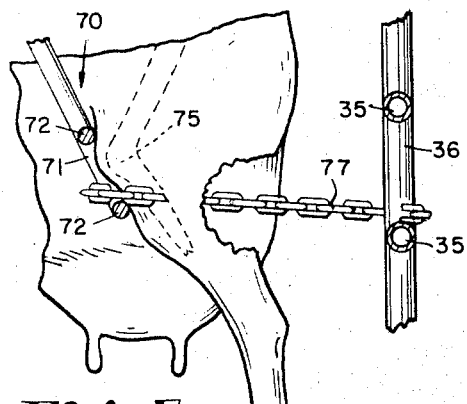
FIG. 5 is a fragmentary view, partially sectioned, showing a portion of the apparatus of the present invention properly engaged with the forward end of the stifle joint of the left, hind leg of the cow.

The free end, indicated generally by the reference number 70, of the swing bar 48 terminates in a rod portion 71 for engaging the forward end of the stifle joint of the cow and means 72 providing an opening for receivably engaging, in part, the flesh external to the stifle joint. In the illustrative embodiment, the above-mentioned means 72 is a C-shaped member connected at its ends to the rod portion 71. In FIGS. 1, 4 and 5 it can be seen that the C-shaped member is connected to the side of the rod portion 71 which generally faces the front side of the stall 10.

The bearing surface provided by the rod portion 71 and C-shaped member (means 72) engages much more flesh than the rod portion 71 alone would and, therefore, there is less likelihood of injuring the cow.

In FIG. 4, it can be seen that the rod portion 71 is bent slightly with respect to the upper portion of the swing bar 48 so that, when the swing bar 48 is swung in against the cow, the rod portion 71 will slope somewhat outwardly from the axis of the bar 48.

In use, the apparatus of the present invention is arranged on the side members of the stall 10 and adjusted so that, when the take-up device 60 is operated to shorten the chain 56, the free end portion 70 is urged, with a constant pressure, into engagement with the stifle joint indicated by the reference number 75 in FIGS. 1 and 5. Specifically, the rod portion 71 is pressed against the forward end of the stifle joint 75. When the rod portion 71 is so pressed, the opening provided by the C-shaped member 72 which is connected to the rod portion 71 receivably engages the flesh external to the stifle joint 75 to prevent movement of the rod portion 71 relative to the stifle joint.

In one embodiment of the present invention, a chain 77 is provided for securely connecting the hind leg of the cow, the stifle joint of which is engaged by the rod portion 71, to the free end portion 70 of the swing bar 48 and one of the members 36 in the gate 31. In use, the chain 77 extends through the opening provided by the C-shaped member 72 and through the space between the left, hind leg of the cow and her udder. Preferably, the chain 77 is provided with a hook 78 which can be engaged with one of the links in the chain 77 securely to fasten it about the leg and the member 36. It is to be pointed out, however, that the use of the chain 77 is only required for cows having a greater propensity to kick and that, in most instances, engagement of the stifle joint 75 and the flesh external to the stifle joint by the free end portion 70 will keep the cow from kicking.

In a preferred form of the present invention, a short bar stop 79 is rigidly fastened to the forward end 50 of the major bar 41 and disposed so as to engage the underneath side of the upper side member 21 to prevent the major bar 41 from accidentally moving above the upper side member 21.

To use the apparatus, the rest bar 43 end portion 45 is placed to rest on the upper side member 21 with the major bar 41 extending forwardly and generally alongside the cow. Thereafter, the spring 62, which hangs downwardly from the end portion 46 is connected to the middle side member 23 and the chain 56, which hangs downwardly from the end portion 45 is connected to the lower side member 26. Upon proper tensioning of the spring 62, the rest bar 43 will rock to an equilibrium position.

The downward swing of the major bar 41 and the swing bar 48 is determined by adjusting the effective length of the chain 64 by engaging the hook 67 in a selected link of the chain 64. Thus, by adjusting the effective length of the chain 64, the free end portion 70 of the swing bar 48 is positioned adjacent the flank of the cow.

After the cow is happily eating her food and it is time to milk, the take-up device 60 is operated to shorten the chain 56 and thereby rock the rest bar 43 to a selected position which will, in turn, engage the rod portion 71 of the swing bar 48 with the forward end of the stifle joint 75, as described previously. Ideally, the spring 54 acts to pull the swing bar 48, within the limits of its travel, against the forward end of the stifle joint 75.

From the above discussion, it is clear that the proper, effective position of the free end portion 70 of the swing bar 48 is obtained by three adjustments, namely, shifting the rest bar 43 along the upper side member 21; adjusting the effective length of the chain 64; and adjusting the effective length of the chain 56 for the proper lateral rocking of the swing bar 48.

Thus, it is to be seen that there are no permanent connections of any part of the apparatus with the stall 10, and that the apparatus is readily adjusted to a particular cow as to her height and body length.

We claim as our invention:

1. An apparatus for preventing a cow from kicking, said apparatus being adapted for use in combination with a stall having a side member and a rear member, said apparatus comprising a crank comprising a rest bar and a major bar carried by and extending from said rest bar, said rest bar being rockably supported on said side member with said major bar extending generally alongside said cow, a swing bar rockably connected to said major bar at a zone spaced from said rest bar and having a free end portion terminating in a rod portion for engaging the forward end of the stifle joint of said cow and means providing an opening for receivably engaging, in part, the flesh external to said stifle joint, means for limiting the rocking of said swing bar to a single plane relative to said major bar, means for selectively positioning said swing bar relative said major bar so as to position said free end portion adjacent the flank of said cow, means for holding said rest bar in a selected rocked position on said side member firmly to press said free end portion into engagement with the stifle joint of said cow, and a flexible member for securing the hind leg of said cow, the stifle joint of which is engaged by said rod portion, to said free end portion and said rear member, said flexible member extending through said opening and the space between said hind leg of said cow and her udder.

2. An apparatus for preventing a cow from kicking, said apparatus being adapted for use in combination with a stall having upper and lower side members and a lower rear member, said apparatus comprising a T-bar comprising a rest bar and a major bar carried by and extending from said rest bar intermediate the rest bar ends, said rest bar being rockably supported on said upper member with said major bar extending generally alongside said cow, a swing bar rockably connected to said major bar at a zone spaced from said rest bar, said swing bar having a free end portion terminating in a rod portion for engaging the stifle joint of said cow and a C-shaped member connected to said rod portion so as to provide an opening for receiving, in part, the flesh external to said stifle joint, means for limiting the rocking of said swing bar to a single plane including said swing bar and said major bar, first flexible means for positioning the free end portion of said swing bar adjacent the flank of said cow, said first flexible means being connected between said upper side member and a portion of said swing bar intermediate its end portions, second flexible means connected between one end of said rest bar and said lower side member, an extensible spring connected between the other end of said rest bar and said lower side member, means for effectively shortening said second flexible means a predetermined amount so as to rock said rest bar in opposition to said spring to a selected position on said upper side member, thereby firmly pressing said rod portion into engagement with the stifle joint of said cow, and third flexible means for securing the hind leg of said cow, the stifle joint of which is engaged by said rod portion, to said free end portion and said rear member, said third flexible means extending through said opening and the space between said hind leg of said cow and her udder.

References Cited

UNITED STATES PATENTS 3,058,447  10/1962  Neuenschwander _____ 119—96
3,266,463   8/1966  Hart et al. _____ 119—96

HUGH R. CHAMBLEE, *Primary Examiner.*

U.S. Cl. X.R.

119—27